Feb. 22, 1949.　　　　　C. L. MOORE　　　　　2,462,211
TRACTOR FIFTH-WHEEL SAFETY LOCK
Filed Feb. 24, 1947　　　　　　　　　　　　　4 Sheets-Sheet 1

INVENTOR
CLYDE L. MOORE

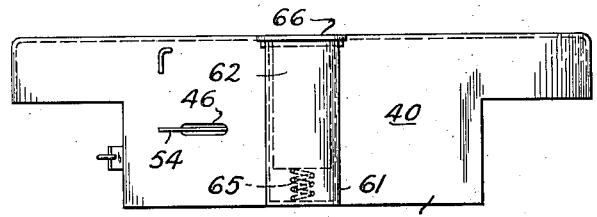
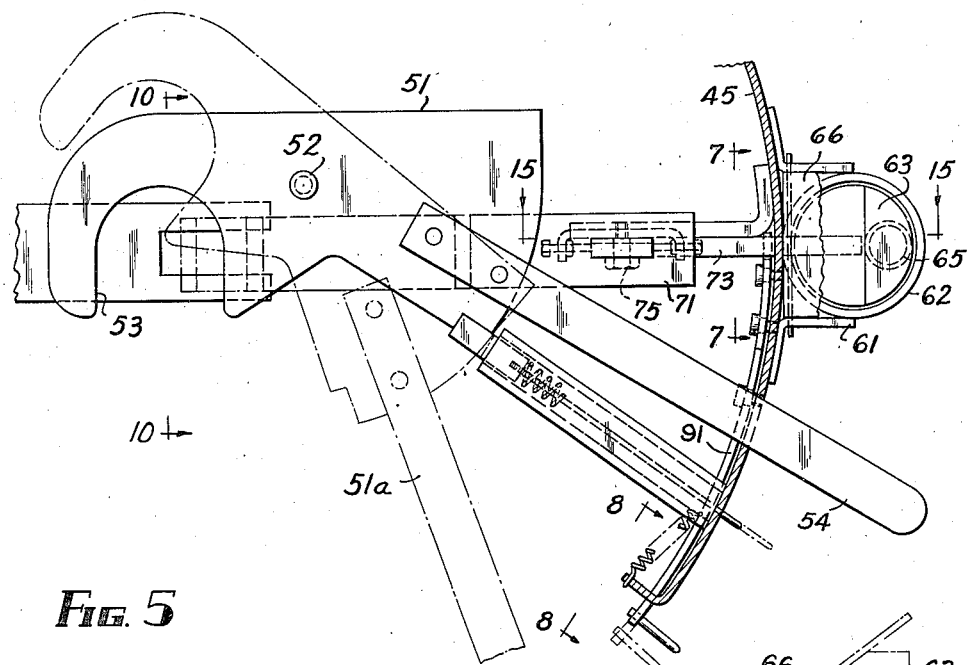
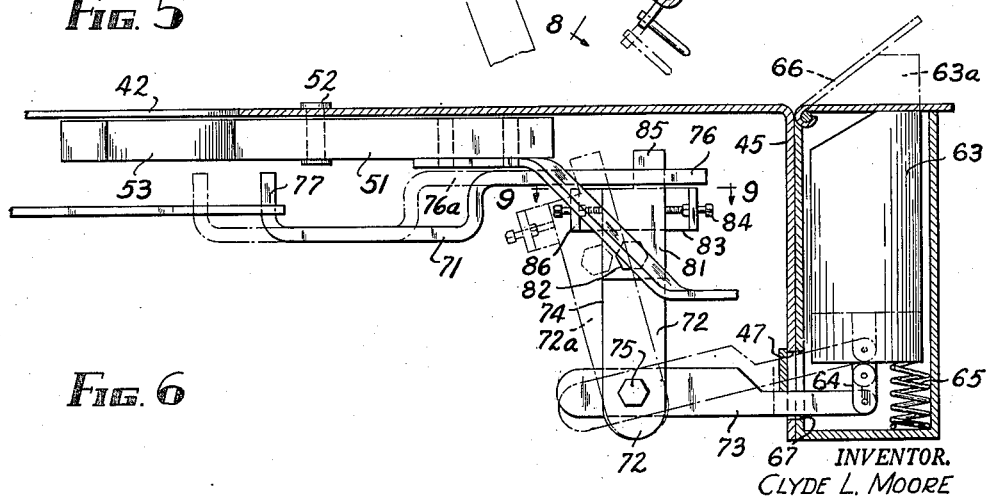

Feb. 22, 1949. C. L. MOORE 2,462,211
TRACTOR FIFTH-WHEEL SAFETY LOCK
Filed Feb. 24, 1947 4 Sheets-Sheet 3

INVENTOR.
CLYDE L. MOORE
BY

Feb. 22, 1949.     C. L. MOORE     2,462,211
TRACTOR FIFTH-WHEEL SAFETY LOCK
Filed Feb. 24, 1947     4 Sheets-Sheet 4

INVENTOR.
CLYDE L. MOORE
BY

Patented Feb. 22, 1949

2,462,211

UNITED STATES PATENT OFFICE 2,462,211

TRACTOR FIFTH-WHEEL SAFETY LOCK

Clyde L. Moore, Cleveland, Ohio

Application February 24, 1947, Serial No. 730,393

5 Claims. (Cl. 280—33.05)

This invention relates to couplers for articulated vehicles such as truck tractors and trailers, and relates particularly to safety type automatic fifth wheels.

Conducive to a better understanding of the invention, it should be pointed out that quite frequently articulated vehicles of the truck type become unhitched during travel and, as a result, severe and costly accidents occur. Frequently, during cold weather, the oil and grease on the coupler hardens and prevents proper locking of the parts. Sometimes dirt and foreign particles find their way into the coupler mechanism and cause the operator or driver to believe that the device is properly locked, when actually it is not. Cases have been known where pranksters or vandals have tampered with the conventional locks when such vehicles were left standing alone and unguarded; with the result that when the driver returned and the vehicle took to the road, often at night at high speed, the sudden separation of the vehicle caused a sudden death or injury.

The primary object of the invention, therefore, is to provide an automatically engaging locking device which safely connects the tractor and trailer together when the normally provided hitch or king-pin breaks or otherwise becomes disengaged or is accidentally left open.

Another object is to control the degree of pressure on the piston lock pin or bolt in the event of failure of the snatch-hitch commonly used on fifth wheels.

A further object is to improve and simplify the means for bringing about adjustment of the relative positions of the safety lock in its connection with the fifth wheel.

Still another object is to provide a device of the type stated that may be easily installed and readily mounted on or attached to presently used conventional couplers.

A still further object is to provide such device with a safety lock that does not inhibit or resist the pivotal action of the coupler in the event the safety lock comes into operation on a turn of the road.

A still further object is to construct a fifth wheel safety device out of relatively a few but durable parts which will operate under careless operating conditions and which will not be effected by adverse weather conditions.

These and other objects of the invention become apparent from a reading of the following description and claims, together with the accompanying drawings, in which like parts are referred to and indicated by like reference characters and wherein:

Figure 4 is an elevation of the front end of the fifth wheel shown in the Figure 2;

Figure 5 is an enlarged plan view of a part of the same fifth wheel taken along the line and in the direction of the arrows 5—5 of the Figure 3;

Figure 6 is a side view of the part of the fifth wheel shown in the Figure 5;

Figure 1:
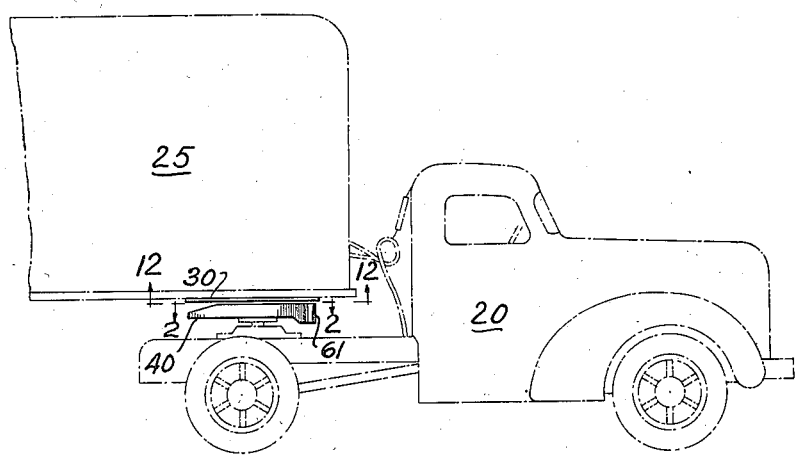
Figure 1 is a side view of an articulated vehicle having a safety coupler made in accordance with this invention.

Referring to Figure 1 of the drawings, there is shown a portion of an articulated vehicle consisting of a tractor 20, a trailer 25, a coupler plate 30 and a fifth wheel 40.

Figure 12:
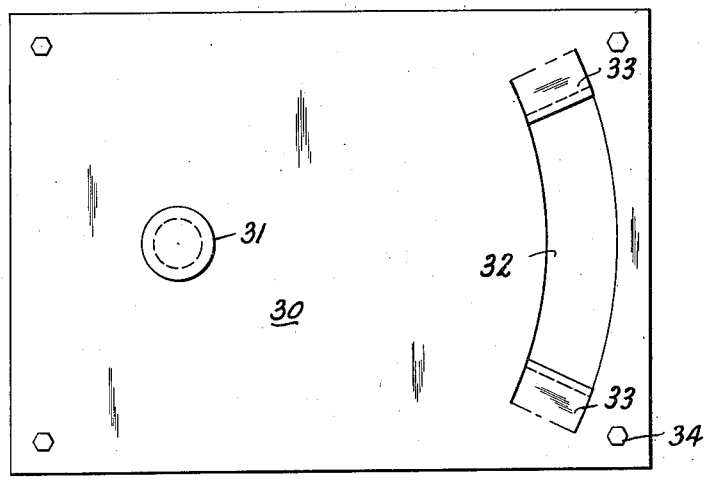
Figure 12 is a bottom view of the car-pin or landing plate taken substantially along the line and in the direction of the arrows 12—12 of the Figure 1.
Figure 13:
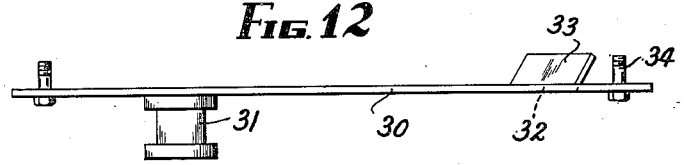
Figure 13 is a side view of the pin plate shown in the Figure 12.
Figure 14:
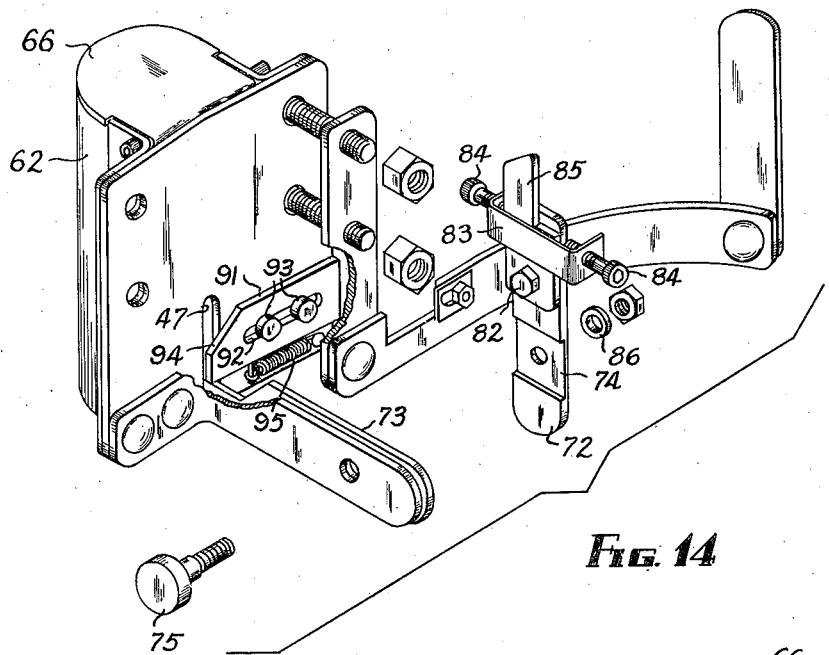
Figure 14 is an exploded perspective view of the safety lock mechanism on the fifth wheel.

The landing or coupler plate 30 is more clearly shown on the Figures 12 and 13, and consists of a rather substantial metal sheet slightly larger than the fifth wheel 40. It has a conventional king-pin 31 depending therefrom and an arcuate slot 32 formed therein as shown. The metal of the ends of the slot are bent upward to form inclined portions 33 and which slidably engage the hereinafter described bolt of the safety lock on the fifth wheel. This plate member 30 is firmly fastened to the bottom of the trailer at its forward end by means of the screws or bolts 34. The king-pin 31 is flanged as shown in order to firmly engage the jaw of the snatch-hitch which will be described in greater detail hereinafter.

The fifth wheel, constituting the primary element of this invention, is more clearly illustrated in whole or in part in the drawings with the exception of Figures 12 and 13. The fifth wheel consists of a pick-up plate 41, a snatch-hitch 51, a safety lock 61, a trigger device 71 and a manual lock or catch 91. Each of these parts or members will be described in detail hereinafter and in the order stated.

The pick-up plate 41 is mounted on the rear of the tractor 20 as shown and may be rigid or floating as desired. It consists of a stout disc of metal having a central hole or socket 42 therein for engaging the aforesaid king-pin 31. Its rear portion 43 is tapered somewhat as shown. It has a rather large notch 44 which opens into the socket 42. The rear portion is inclined downward slightly to facilitate engagement with the coupler landing plate member 30.

The front part of the fifth-wheel pick-up plate 41 has a depending wall 45 on which the safety lock 61 is mounted. The wall also has a horizontal slot 46 for movably receiving the handle of the snatch-hitch 51. It also has a vertical slot 47 which receives the lever arm of the trigger device 71.

The snatch-hitch 51 is shaped somewhat as shown in the Figure 5. It is pivoted to the pick-up plate 41 by the pin 52. Its rear end has a jaw 53 directly under the socket 42 which engages the king-pin 31 and the flanges thereof when the latter is inserted in the socket 42. This jaw 53 is so shaped and positioned that it automatically closes or engages the king-pin when the trailer is engaged with the tractor. The forward end of the hitch 51 has an arm and a handle 54 which moves in the horizontal slot 46. The jaw 53 of the hitch is heavy and thick and provides a stout bearing for the king-pin. In the drawing, the character 51a indicates the alternate position of the hitch.

The safety lock 61 is a bolt action device. It consists of a cylinder or receptacle 62 mounted vertically on the front of the fifth wheel. Inside the receptacle 62 there is a movable bar or plug of metal herein referred to as the bolt 63. The bottom of the bolt has a small link 64 attached thereto. A durable and rather heavy expansion spring 65 is mounted in the bottom of the receptacle and tends to urge the bolt 63 upward or out of the receptacle. The receptacle has a vertical slot 67 which is aligned with the heretofore referred to slot 47. A small lid or cover 66 is provided for the receptacle 62 to prevent dust or other substance from entering into it and interfering with the proper action of the bolt 63.

The trigger device 71 actuates the safety lock 61 when improper or unintentional separation of the vehicle takes place. It consists broadly of an L-shaped lever 72 and a slidable bar 76.

The L-shaped lever 72 is mounted vertically and so is pivoted on the horizontal pin 75. The horizontal arm 73 passes through and moves in the slots 47 and 67 and is connected to the link 64.

The slidable bar end 76 is mounted longitudinally below the pick-up plate and slightly forward of the socket 42, and engages the vertical arm 74 of the L-shaped lever.

The rear portion of the trigger bar 76 has an ascending portion 77 which abuts and is moved by the king-pin 31 as it passes through the notch 44 into the socket 42.

Normally, when the tractor and trailer are separated, the ascending portion 77 is under the central hole or socket 42, that is, at about where the center of the jaw 53 would be when the snatch-hitch 51 is in its closed or locked position. When the tractor and trailer are hitched as shown in the Figure 1, the ascending portion 77 is moved forward by the king-pin and flanges thereof to a position slightly forward of the socket 42.

In order to properly coordinate the action of the bolt 63 with the action of the slidable bar 76, an adjustment means is attached to the lever arm 74 which directly engages the front portion of the slidable bar. This is necessary so that the projected bolt 63 will engage the arcuate slot 32 before the king-pin 31 is removed or otherwise displaced from the socket.

The adjusting means referred to is really an extension of the arm 74. It consists of a short arm 81 pivoted to the lever arm 74 at the pin 82. It has a finger portion 85 which is engaged by and directly contacts the bar end 76. Below the finger portion 85 and above the pivot pin 82, there is a bracket 83. This bracket 83 is attached to the arm 74 and has two aligned parallel lugs 86. These lugs 86 are drilled and tapped and suitably provided with set screws 84. The set screws position the finger 85 on the lever 72 and thereby determines the position of the bar portion 76 for releasing the bolt 63 in an emergency. In the Figure 6, the characters 72a, 76 and 63a indicate the relative alternate positions of the lever 72, the bar 76 and the bolt 63.

It is desirable at times to be able to fix the bolt 63 and the lever 72 in the normal or unlocked emergency position. For this purpose, there is provided a manual catch 91 which slides across the slots 47 and 67. This catch slides over the horizontal arm 73 of the L-shaped lever and this prevents the bolt 63 from being projected regardless of the position of the movable bar 76.

Figure 8:
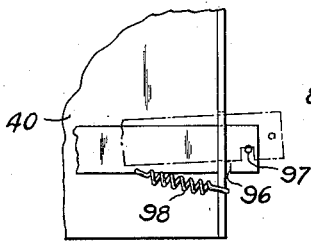
Figure 8 is an elevational view of another part of the device, taken along the line and in the direction of the arrows 8—8 of the Figure 5.
Figure 9:
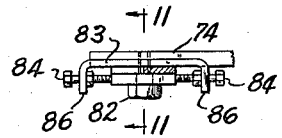
Figure 9 is a horizontal or plan view of another part of the device, taken along the line 9—9 of the Figure 6.
Figure 10:
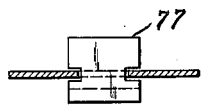
Figure 10 is an elevational view of another part of the device, taken along the line and in the direction of the arrows 10—10 of the Figure 5.
Figure 11:
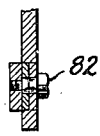
Figure 11 is a vertical cross-sectional view of the element shown in the Figure 9.

This manual catch 91 has a longitudinal slot 92 therein, through which passes two shouldered bolts 93. The end 94 is movable to engage the lever arm 72. A small compression spring 95 tends to keep the catch in the free or open position so that the lever arm 72 may actuate the bolt 63 if necessary. The other end of the catch 91, which is mounted on the depending wall 45 of the pick-up plate, has a notch 96 therein for engaging the pin 97. This construction is clearly shown in the Figure 8. The spring 99 retains the catch in its locked position.

Figure 2:
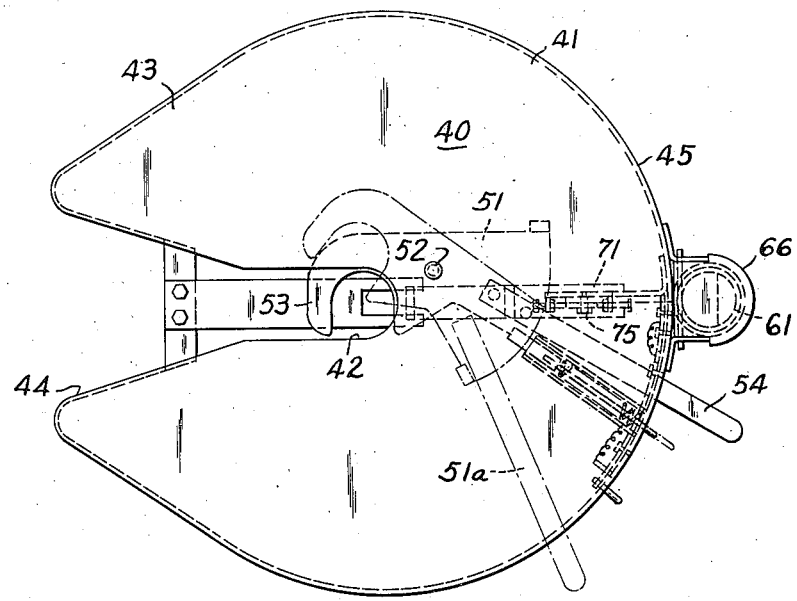
Figure 2 is an enlarged top plan view of the fifth wheel or bottom part of the coupler taken substantially along the line and in the direction of the arrows 2—2 of the Figure 1.
Figure 3:
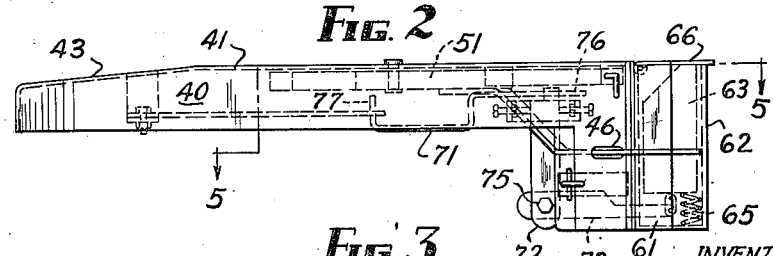
Figure 3 is a side elevation of the fifth wheel shown in the Figure 2.
Figure 7:
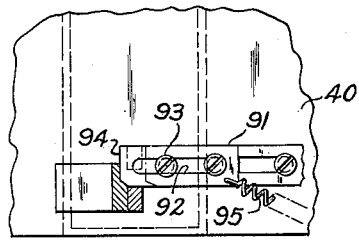
Figure 7 is an elevational view of a part of the device, taken along the line and in the direction of the arrows 7—7 of the Figure 5.

When used, the fifth-wheel 40, together with the snatch-hitch 51, the trigger means 71, and the safety bolt or lock 61 and their respective parts, somewhat as illustrated in the Figure 2, are mounted on the tractor 20 as shown in the Figure 1. The landing plate 30 with the king-pin 31, somewhat as illustrated in the Figures 12 and 13, are attached to the front bottom portion of the trailer, also as shown in the Figure 1.

Ordinarily, the trailer 25 is stored or parked separate and apart from the tractor. It is held in an upright position or horizontal position by means of a suitable jack which is not shown herein, since it is not a part of this invention. However, its design and application are well known in the art.

When connecting the tractor and trailer together for transport, the tractor 20 is slowly backed up so that the notch 44 and the central socket of the fifth-wheel engage the king-pin 31. When the king-pin nears the center of the socket, two things occur almost simultaneously. First, the king-pin 31 strikes the upright portion 77 of the slidable bar and moves it forward. Second, the king-pin strikes the inner side of the jaw 53 and causes the snatch-hitch 51 to move inward or toward the center and under the opening 42. The king-pin is thus automatically engaged. The standard lock found on most conventional fifth-wheels consists of a snatch-hitch similar to the one indicated herein as 51. To release the standard lock, a lever like the one indicated at 54 is pulled outward while the tractor is slowly moving forward.

When the king-pin 31 is properly engaged and in the opening 42, the end 77 of the trigger means is in the position shown in full lines in the Figure 6. The front end of the slidable bar 76 is forward and forces the upright arm 74 of the L-shaped lever to be in its vertical position. The arm 73 is thus made to assume its horizontal position and the bolt 63 is drawn downward or inward against the compression of the spring 65. The lid or cover 66 is automatically closed and the bolt 65 and the trigger 71 elements are as shown in the full lines of the Figure 6. When in this position, the stress and strain of the pivoted connection between the tractor and trailer are entirely centered at the king-pin 71 and the jaw 53.

Figure 15:
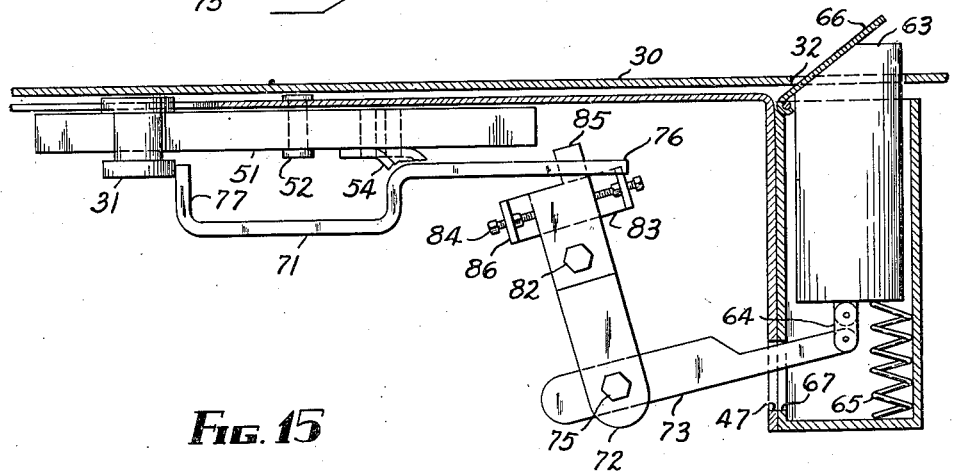
Figure 15 is a side elevation of the safety lock engaging the car-plate 10 as in an emergency.

In the event of an accident, for example if the jaw 53 should break or if the snatch-hitch pin 52 should shear off or loosen, the king-pin would immediately tend to move out of the central hole or socket 42. However, before it has a chance to move very far out of its normal central position, the L-shaped lever 74 will assume an inclined position somewhat as shown in the Figure 15 and by the broken lines of the Figure 6. When in this inclined position, the compression spring 65 will urge the bolt 63 to its upward or engaging position and, when in such engaging position, the projecting head of the bolt will fit into the arcuate slot 32 of the landing plate 30. Therefore, the stress of the connection between the two vehicles is transferred to the bolted and slotted landing plate from the normally engaged king-pin and jaw members. While thus engaged, in an emergency the vehicle may continue en route and until repairs to the major connection can be conveniently made. This emergency engagement of the bolt with the landing plate will prevent injury and damage ordinarily caused by a complete separation of the two moving vehicles.

It has been further found from experience that most separation accidents of vehicles of this type occur when rounding corners or on sharply curved highways. This is probably due to the centrifugal force acting on the points of major connection, in addition to the normal longitudinal strain of the pulling action. Therefore, in order to provide for such situations, the engaging slot 32 of the landing plate 30 is made curved or arcuate as shown so that the bolt 63 may be engaged even though the two vehicles are on a curve or are otherwise unaligned.

Having thus disclosed the invention in its preferred form, it should be understood that there may be other forms or modifications of the invention which might also come within the scope of the claims, as no limitations or restrictions are intended except those imposed thereon by the scope of the following claims.

I claim:

1. In an articulated vehicle, a safety coupler, comprising in combination, a fifth-wheel having a socket, a plate member having a king-pin engageable by the socket and an arcuate slot therein, a snatch-hitch mounted on the fifth-wheel engageable with the king-pin, and a safety-lock mounted on the fifth-wheel and including a trigger means capable of being actuated by the king-pin when the latter is unintentionally disengaged from the snatch-hitch and a bolt mechanism connected to the trigger means engageable by the arcuate slot when the said trigger means is actuated.

2. In an articulated vehicle, a safety coupler, comprising in combination, a fifth-wheel having a central socket and a vertical receptacle mounted on the tractor of the articulated vehicle, the said receptacle having a cover, a plate member having a king-pin engageable by the socket and an arcuate slot proximate to the receptacle mounted on the trailer of the said articulated vehicle, an automatically operating bolt device normally in the covered receptacle and capable of extending into the said arcuate slot, and a safety-lock mounted on the fifth-weel and having a trigger portion actuated by the king-pin capable of releasing the bolt for extension into the arcuate slot.

3. In an articulated vehicle, a safety coupler, comprising in combination, a fifth-wheel having a socket, a plate member having a king-pin engageable by the socket, a snatch-hitch mounted on the fifth-wheel engageable with the king-pin, a safety-lock mounted on the fifth-wheel and including a trigger means capable of being actuated by the king-pin when the latter is unintentionally disengaged from the snatch-hitch and a bolt mechanism connected to the trigger means engageable with the plate member when the said trigger means is actuated and a manually operable catch means mounted on the fifth-wheel retaining the said snatch-hitch and safety-lock in normally hitched and unlocked positions.

4. A fifth-wheel, comprising in combination, a pick-up plate having a central socket therein and a bolt device mounted thereon, an L-shaped lever vertically mounted below the pick-up plate and having the horizontal arm thereof connected to the said bolt and a slidable bar mounted below the pick-up plate proximate to the central socket and movable by a coupler king-pin, the said slidable bar being linked to the vertical arm of the said lever.

5. A fifth-wheel, comprising in combination, a pick-up plate having a central socket therein and a bolt device mounted thereon, an L-shaped lever vertically mounted below the pick-up plate and having the horizontal arm thereof connected to the said bolt, a slidable bar mounted below the pick-up plate proximate to the central socket and movable by a coupler king-pin, the said slidable bar being linked to the vertical arm of the said lever and a manually operable catch means mounted on the pick-up plate proximate to the bolt and engageable with the horizontal arm of the said lever and capable of retaining the same in a predetermined position.

CLYDE L. MOORE.

REFERENCES CITED

The following references are of record in the file of this patent:

UNITED STATES PATENTS

| Number | Name | Date |
|---|---|---|
| 2,043,342 | Walker | June 9, 1936 |
| 2,318,038 | Winn | May 4, 1943 |
| 2,400,738 | Brown | May 21, 1946 |